Figure 1:
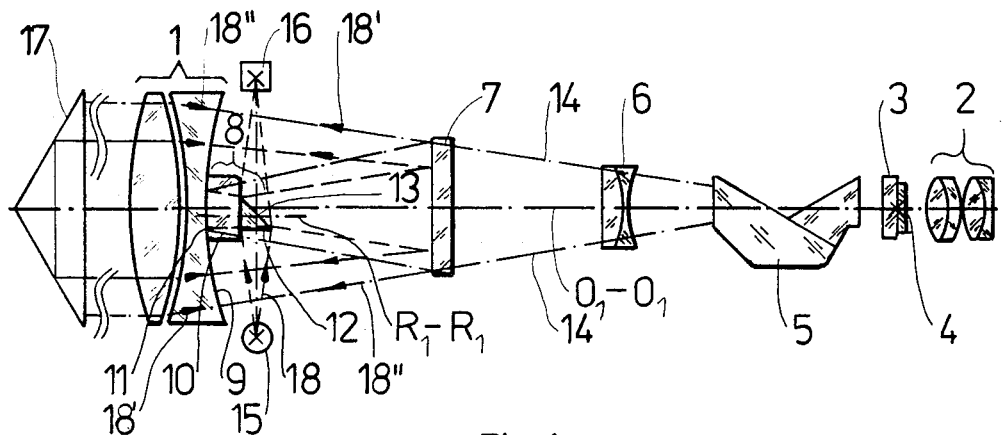

United States Patent [19]

Heinze et al.

[11] Patent Number: 4,504,143
[45] Date of Patent: Mar. 12, 1985

[54] OPTICAL ARRANGEMENT FOR AN OPTO-ELECTRONIC RANGE-FINDER

[75] Inventors: Rudi Heinze; Rolf Röder; Wieland Feist, all of Jena, German Democratic Rep.

[73] Assignee: Jenoptik Jena G.m.b.H., Jena, German Democratic Rep.

[21] Appl. No.: 387,688

[22] Filed: Jun. 23, 1982

[30] Foreign Application Priority Data

Jul. 1, 1981 [DD] German Democratic Rep. ... 231365

[51] Int. Cl.³ .......................... G01C 3/08; G02B 23/04
[52] U.S. Cl. ........................................ 356/5; 350/445; 350/446; 350/557
[58] Field of Search ...................... 350/445, 446, 557; 356/5

[56] References Cited

U.S. PATENT DOCUMENTS

| | | | |
|---|---|---|---|
| 2,661,658 | 12/1953 | Dyson | 350/445 |
| 3,256,766 | 6/1966 | Allesson | 356/5 |
| 3,619,058 | 11/1971 | Hewlett et al. | 356/5 |
| 4,165,936 | 8/1979 | Eisenring et al. | 356/5 |

Primary Examiner—S. C. Buczinski

[57] ABSTRACT

The invention relates to an optical arrangement for a range-finder having an observation path of beams and a measuring path of beams constituted of an objective and a reflection system arranged in the near-axial room behind and in close contact to the objective. The reflection system is laterally displaced in parallel to the objective axis and has a second reflecting face at right angles to the optical axis and a first reflecting face inclined by 45° relative to the optical axis, the extension of the latter at right angles to the optical axis is smaller than the corresponding extension of the second reflecting face.

4 Claims, 2 Drawing Figures

OPTICAL ARRANGEMENT FOR AN OPTO-ELECTRONIC RANGE-FINDER

The invention relates to an optical arrangement for an opto-electronic range-finder including an objective, a reflection system in the near-axial room subsequent to the objective, a reflector in opposition to the rear face of the objective, a sender for emitting a measuring radiation to a measuring reflector via the reflection system, the reflector and the objective, said measuring reflector back reflects the measuring beam to a detector via the objective, the reflector and reflection system.

It is known to use in opto-electronic range-finders one and the same telescope for a visual target finding and for shaping, emitting and detecting the measuring beam. The observation path of beams and the measuring path of beams are bi-axially or coaxially arranged to one another. In the range-finders of this kind a direct vision target telescope is used whereas the measuring light is directed via reflection systems which are symmetrically arranged about the optical axis.

The reflection systems obscure the observation and the measuring light in the near-axial room of the range-finder in the vicinity and outside of the objectives.

Such arrangements are disadvantageous when near targets have to be observed or targets have to be observed through narrow tubes since the measuring radiation is required in the near-axial room.

In this event comparatively large reflecting faces have to be employed in the vicinity of the telescope axis for producing semi-pupils, and a plurality of reflecting and imaging systems for directing the measuring path of beams from the sender into the telescope and from the latter to the detector.

It is an object of the present invention to obviate the above disadvantages.

It is a further object of the present invention to reduce the number of optical components and systems otherwise required.

It is still a further object of the present invention to provide a compact opto-electronic range-finder the optical system of which in spite of the small size of the reflecting faces involved ensures a sufficient transmission of the measuring radiation from the sender to the detector.

It is still a further object of the present invention to provide an optical system of an opto-electronic range-finder which ensures an optimal exploitation of the reflecting faces when forming the measuring path of beams.

These and other objects are realised in an opto-electronic range-finder in which the reflection system is displaced in parallel to the optical axis of the objective. In the emitted measuring beam the following components are subsequently arranged: a reflecting face inclined by substantially 45° to the optical axis, the inclination being towards the objective, a further reflecting face at right angles to the optical axis between the inclined reflecting face and the objective. In the detecting beam a reflecting face substantially in parallel to the inclined reflecting face is arranged between the inclined reflecting face and the reflector. The extension of the inclined face at right angles to the optical axis is smaller than the equally directed extension of the reflecting face at right angles to the optical axis.

This permits to arrange the sender and the detector in the vicinity of the path of beams of the telescope of the opto-electronic range-finder under consideration of the opening angle of the arrangement, and to make the optical system of the sender and the detector considerably short.

Furthermore, it is feasible to do with only a few reflecting members for the measuring beam and to detect near and remote targets to which the measuring reflector is attached without any switch-over or displacement of optical components.

In a simple embodiment of the invention the two reflecting faces inclined by 45° to the optical axis coincide.

When, however, the reference path (shorted path) has to be directed also by the same reflection system it is advantageous to render the inclined reflecting face transmissive for the measuring radiation in the optical axis, and the further reflecting face in parallel to the inclined reflecting face belongs to a rhomboidal prism attached to the inclined reflecting face. Advantageously, the reflecting face at right angles to the optical axis contacts a portion of the rear face of the objective, which yields a particularly suitable solution for the length of the telescope.

It is understood that the reflection system and the objective in adaption to the measuring beam are of a cylindrical geometry.

Figure 2:
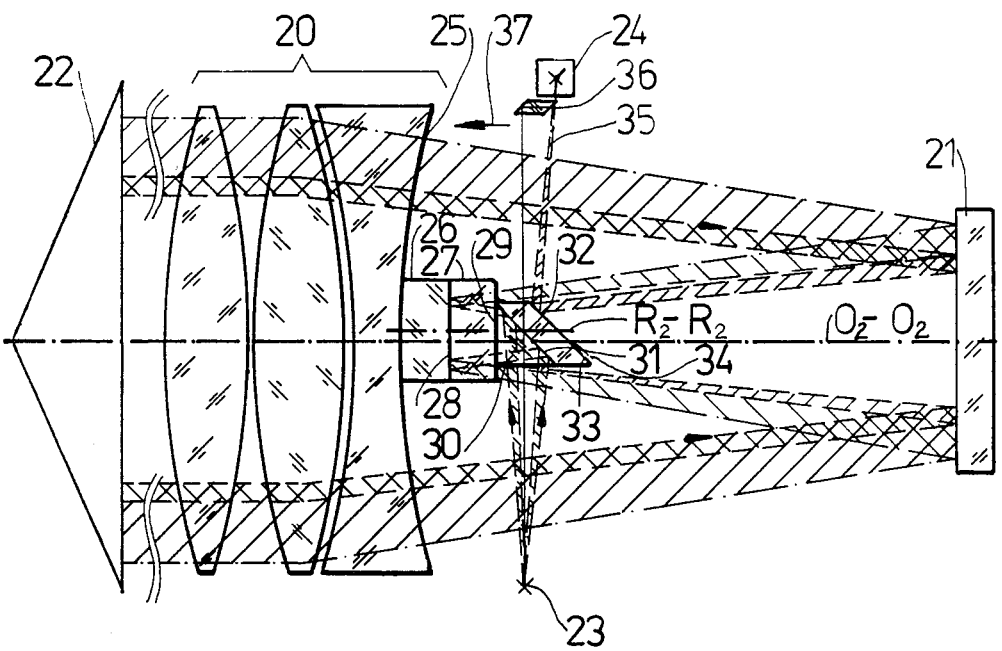

In order that the invention may be more readily understood reference is made to the accompanying drawings which illustrate diagrammatically and by way of example two embodiments thereof and where FIG. 1 is a schematic view of an optical arrangement for an opto-electronic range-finder, and FIG. 2 is a further embodiment of FIG. 1.

In FIG. 1 an optical arrangement is constituted of an objective 1 and an eyepiece 2 about a common optical axis $O_1$—$O_1$.

A transparent carrier 3 for a target marking 4, a reversing prism 5 for producing an upright and truesided target image are inserted between said objective 1 and said eyepiece 2 subsequent to the latter about the optical axis $O_1$—$O_1$.

The prism 5 is followed by a focusing lens 6, a partially transmissive reflector 7 and reflection system 8 cemented to a rear face 9 of the objective 1. The reflection system 8 has an optical axis R—R which is in narrow spaced and parallel relation to the optical axis $O_1$—$O_1$, and is constituted of a cylinder 10 the silvered base face of which is cemented to a plane near-axial portion 11 of the rear face 9. The top face of the cylinder 10 is connected to a right angle prism 12 having a reflecting hypotenuse face 13.

The projection of the hypotenuse face 13 onto the top face of the cylinder 10 is smaller than the top face. A sender 15, on the one hand, and a detector 16, on the other hand, are arranged in opposition to one another and laterally to a telescope path of beams 14 in the focal plane of the objective 1.

A measuring reflector 17, for example, a triple prism, is attached to a target point (not shown) to be measured remote from the telescope 1-2 of a not further shown opto-electronic range-finder.

In operation the telescope 1-2 is aligned to the measuring reflector 17 via the eyepiece 2 by means of the cross wire 4.

The measuring beam 18 originating from the sender 15 impinges upon the hypotenuse face 13 without passing any intermediate optical means, and is reflected to the silvered base face of the cylinder 10 and from there towards the reflector 7, however, only that portion of the measuring beam 18 arrives at the reflector 7 which laterally passes the right angle prism 12.

The measuring beam 18', 18" reflected at the reflector 7 is of an annular cross-section (annular pupil) and is directed through the objective 1 to the measuring reflector 17 for being reversely reflected through the objective 1 to the reflector 7.

Due to the downward parallel displacement of the axis $R_1$—$R_1$ relative to the axis $O_1$—$O_1$ in FIG. 1 only that portion of the hypotenuse face 13 receives a portion of the measuring beam 18" which is adjacent the reflector 7.

This portion of the measuring beam impinges upon the detector 16 which measures the distance of a near target point.

In FIG. 2 an objective 20 having an optical axis $O_2$—$O_2$, a reflector 21, a measuring reflector 22, a sender 23 and a detector 24 are shown.

The objective 20 has a rear face 25 to which an optical cylinder 27 is attached via an intermediate piece 26. The cylinder 27 has a reflective face 28 in close contact with said intermediate piece 26. A right angle prism 30 is cemented to a non-reflective face 29 of the cylinder 27. A reflective hypotenuse face 31 of the cylinder 27 has a non-reflective portion 32 about the optical axis $O_2$—$O_2$.

A rhomboidal prism 33 is attached to the hypotenuse face 31 having a reflecting face 34 in spaced and parallel relation to the hypotenuse face 31, both faces 31 and 34 are inclined to the optical axis $O_2$—$O_2$ and include an angle of 45° with the latter.

The reflection system is comprised of the components 27, 28, 29, 30, 31, 32, 33, 34 about an optical axis $R_2$—$R_2$ which is in narrow spaced and parallel relation to and above said optical axis $O_2$—$O_2$.

A rhomboidal prism 36 is inserted into the measuring beam 35 between the hypotenuse face 31 and the detector 24 outside of the room defined by the reflector 21 and the objective 20.

Said prism 36 displaces the measuring beam 35 in parallel to itself.

The non-reflecting portion 32 and the rhomboidal prism 33 establish a reference measuring path from the sender 23 to the detector 24.

In the proper distance measurement the rhomboidal prism 33 is displaced out from the measuring beam 35 in direction of an arrow 37.

The measuring beam 35 originates from the sender 23 via the hypotenuse face 31 to impinge upon the reflecting face 28 and is reflected from there to the right angle prism 30 and passes the latter with an annular cross-section due to the central obscuration to the reflector 21 which directs the measuring beam 35 through the objective 20 to the measuring reflector 22. The measuring beam laterally reversed by the measuring reflector 22 impinges upon the reflector 21 via the objective 20.

The detector 24 receives only that portion of the measuring beam reflected at the reflector 21 which is reflected from that portion of the reflecting face 34 which, due to the parallel displacement of the axis $R_2$—$R_2$ relative to the axis $O_2$—$O_2$ is remote from the reflector 21.

The further set-up and operation of the arrangement is in analogy to that of FIG. 1.

We claim:

1. An optical arrangement for an opto-electronic range-finder comprising in optical alignment,
    an objective,
    a reflecting system,
    a reflector,
    a sender for emitting a measuring beam,
    a measuring reflector, for reflecting said emitted measuring beam, said emitted measuring beam being the measuring beam to be detected after reflection,
    a detector for detecting said measuring beam to be detected,
    said objective having a front face in spaced opposition to said measuring reflector, and a rear face in opposition to said reflector,
    said measuring reflector, said objective and said reflector having a common optical axis,
    said reflecting system being cemented to a near-axial portion of said rear face,
    and being for obscuring said near axial-portion of said objective,
    said detector and said sender being arranged at right angles to said common optical axis laterally to and between said objective and said reflector,
    said detector and said sender being in opposition to one another,
    said emitted measuring beam being directed via said reflection system, said reflector and a non-central portion of said objective to said measuring reflector,
    said measuring beam to be detected being directed from said measuring reflector via said non-central portion of said objective, via said reflector and via the reflection system to said detector,
    said reflecting system having a diameter, considered at right angles to said common optical axis, smaller than the objective diameter,
    said reflecting system being arranged between said objective and said reflector and having an optical axis in spaced and parallel relation to said common optical axis and being constituted of a first, a second, and a third reflecting face,
    said second reflecting face being a plane reflector,
    said first reflecting face being inclined by 45° to said optical axis towards said objective, said second reflecting face being arranged between said first reflecting face and
    said rear face at right angles to said optical axis,
    said first and said second reflecting face being subsequently arranged in said emitted measuring beam,
    said third reflecting face being substantially in parallel to said first reflecting face arranged between said reflecting face and said reflector,
    said third reflecting face being arranged in said measuring beam to be detected,
    a projection of said first reflecting face onto said second reflecting face being smaller than said second reflecting face.

2. An optical arrangement as claimed in claim 1, wherein said third reflecting face and said first reflecting face coincide for reflecting said emitted measuring beam to said second reflecting face and said measuring beam to be detected to said detector, respectively.

3. An optical arrangement as claimed in claim 2, wherein said near-axial portion of said rear face is a plane face to which said second reflecting face of said reflecting system is cemented.

4. An arrangement as claimed in claim 1, wherein said first reflecting face is transmissive for a near axial portion of the measuring beam and wherein said third reflecting face is part of a rhomboidal prism mounted on said first reflecting face.

* * * * *